(12) United States Patent
Agarwal et al.

(10) Patent No.: US 8,175,248 B2
(45) Date of Patent: May 8, 2012

(54) METHOD AND AN APPARATUS TO DISAMBIGUATE REQUESTS

(75) Inventors: Rajeev Agarwal, Fremont, CA (US); David Ardman, Dollard des-Ormeaux (CA); Muneeb Master, Dollard des-Ormeaux (CA); David Andrew Mauro, Montreal (CA); Vijay R. Raman, Pleasanton, CA (US); Amy E. Ulug, San Jose, CA (US); Zulfikar Valli, Laval (CA)

(73) Assignee: Nuance Communications, Inc., Burlington, MA (US)

( * ) Notice: Subject to any disclaimer, the term of this patent is extended or adjusted under 35 U.S.C. 154(b) by 1497 days.

(21) Appl. No.: 11/701,811

(22) Filed: Feb. 2, 2007

(65) Prior Publication Data

US 2008/0187121 A1    Aug. 7, 2008

Related U.S. Application Data

(63) Continuation-in-part of application No. 11/699,899, filed on Jan. 29, 2007, now abandoned.

(51) Int. Cl.
*H04M 3/42* (2006.01)
(52) U.S. Cl. .............................. 379/218.01; 379/218.02
(58) Field of Classification Search ............. 379/218.01, 379/265.01–265.14, 266.01–266.1; 707/10
See application file for complete search history.

(56) References Cited

U.S. PATENT DOCUMENTS

| | | | | |
|---|---|---|---|---|
| 4,468,756 A | * | 8/1984 | Chan | 704/4 |
| 4,777,600 A | * | 10/1988 | Saito et al. | 715/234 |
| 6,067,520 A | * | 5/2000 | Lee | 704/270 |
| 6,163,767 A | * | 12/2000 | Tang et al. | 704/231 |
| 6,269,335 B1 | * | 7/2001 | Ittycheriah et al. | 704/270 |
| 6,421,672 B1 | * | 7/2002 | McAllister et al. | 1/1 |
| 6,804,330 B1 | * | 10/2004 | Jones et al. | 379/88.01 |
| 2002/0128831 A1 | * | 9/2002 | Ju et al. | 704/231 |
| 2003/0191625 A1 | | 10/2003 | Gorin et al. | |
| 2005/0131892 A1 | | 6/2005 | Knott et al. | |
| 2005/0259806 A1 | * | 11/2005 | Chang | 379/218.01 |
| 2006/0004571 A1 | * | 1/2006 | Ju et al. | 704/243 |
| 2006/0026122 A1 | | 2/2006 | Hurwood et al. | |
| 2006/0143007 A1 | | 6/2006 | Koh et al. | |

OTHER PUBLICATIONS

PCT Search Report and Written Opinion, PCT/US08/01416, mailed on Aug. 1, 2008, 10 pages.

* cited by examiner

*Primary Examiner* — William Deane, Jr.
(74) *Attorney, Agent, or Firm* — Michael A. Glenn; Glenn Patent Group

(57) ABSTRACT

A method and an apparatus to disambiguate requests are presented. In one embodiment, the method includes receiving a request for information from a user. Then data is retrieved from a back-end database in response to the request. Based on a predetermined configuration of a disambiguation system and the data retrieved, the ambiguity within the request is dynamically resolved.

25 Claims, 9 Drawing Sheets

| Disambiguation rule | Open/closed Threshold | Open disambiguation prompt | Closed disambiguation prompt | Confirmation prompt |
|---|---|---|---|---|
| <name> | 5 | "I found several listings that match that name. Please say the complete name of the listing again." | "I found the following listings that match that name: [<name>]. Which would you like?" | "Okay, to confirm. That was <name>. Right?" |
| <caption> <street> | 4 | "I found several listings that match that. Can you give me either a street or department?" | "I found <COUNT> listings for <name>: [one for <caption> on <street> OR one on <street> OR one for <caption>]. Which one is it?" | -- |
| <street> | 5 | "I found several matches for that listing. Please give me the name of the street it is on." | "I found several listings that match: [one on <street>]. Which one is it?" | "Okay, to confirm. That was <name> on <street>. Right?" |
| <caption> | 5 | "I found several departments or sublistings for that listing. Please tell me which department or sublisting you are looking for." | "I found several departments or sublistings for that listing: [one for <caption>]. Which one is it?" | "Okay, to confirm. That was <name>, <caption>. Right?" |

FIG. 3

METHOD AND AN APPARATUS TO DISAMBIGUATE REQUESTS

This application is a Continuation-in-part of the prior application for "A METHOD AND AN APPARATUS TO DISAMBIGUATE REQUESTS" filed by Rajeev Agarwal, David Ardman, Muneeb Master, David Andrew Mauro, Vijay R. Raman, Amy E. Ulug, and Zulfikar Valli on Jan. 29, 2007 (U.S. patent application Ser. No. 11/699,899) now abandoned.

TECHNICAL FIELD

The present invention generally relates to enhancing search of information in an interactive voice response (IVR) system, and more particularly, to disambiguating search requests in an IVR system.

BACKGROUND

Speech applications, which generally refer to applications that process speech, have undergone rapid advancement in recent years and are finding widespread use in many different areas. One widespread use of speech applications is in "call handling." A common example of call handling applications is automated directory assistance. Automated directory assistance is being used by businesses more and more commonly to handle incoming telephone calls requesting information. An automated directory assistance application may receive a spoken request from a telephone caller for information, such as a telephone number, recognize the caller's speech to identify the requested information, and provide the requested information to the caller using recorded or synthesized speech. For instance, automated directory assistance may be incorporated into a company's telephone network to allow callers to retrieve telephone extension numbers of employees. In another example, a telephone service provider provides automated directory assistance to look up telephone numbers requested by users. Such a system might be implemented, for example, in a call center associated with a telephone network, such as a public switched telephone network (PSTN), a voice over Internet Protocol (VoIP) network, etc.

However, ambiguous situations sometimes arise when several entries match a request from a caller, and thus, additional constraints from the caller are needed to help narrow down the result. Examples of such disambiguation situations include selecting from a list of matching flights in a flight reservation system, choosing a restaurant from a list of matching restaurants in a dining guide application, providing disambiguating information to narrow down the desired listing in a directory assistance application, etc.

Many speech applications have designed and developed custom disambiguation strategies, applicable only to a particular application instance or domain. To design a custom disambiguation strategy, the entire list of possible dialog paths and dialog states has to be enumerated at design time. At runtime, an incoming request from a caller and/or data retrieved in response to the incoming request are compared to the static list of possible dialog paths and dialog states for determining if disambiguation is needed. If disambiguation is needed, then a predefined disambiguation prompt is played out to the caller. However, the above approach is fraught with problems. First, it is cumbersome to pre-specify all the states since the number of all possible dialog paths and dialog states may be prohibitively large. Further, by designing and coding a specific dialog strategy, it becomes infeasible, if not impossible, to modify the dialog behavior later without significant code modifications.

SUMMARY

The present invention includes a method and an apparatus to disambiguate search requests. In one embodiment, the method includes receiving a request for information from a user. Then data is retrieved from a back-end database in response to the request. Based on a predetermined configuration of a disambiguation system and the data retrieved, the ambiguity within the request is dynamically resolved. The configuration may include a set of rules and policies configurable by an integrator (also known as the administrator) of the system.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3 shows a table of exemplary disambiguation rules according to one embodiment of the invention;

DETAILED DESCRIPTION

Figure 1:
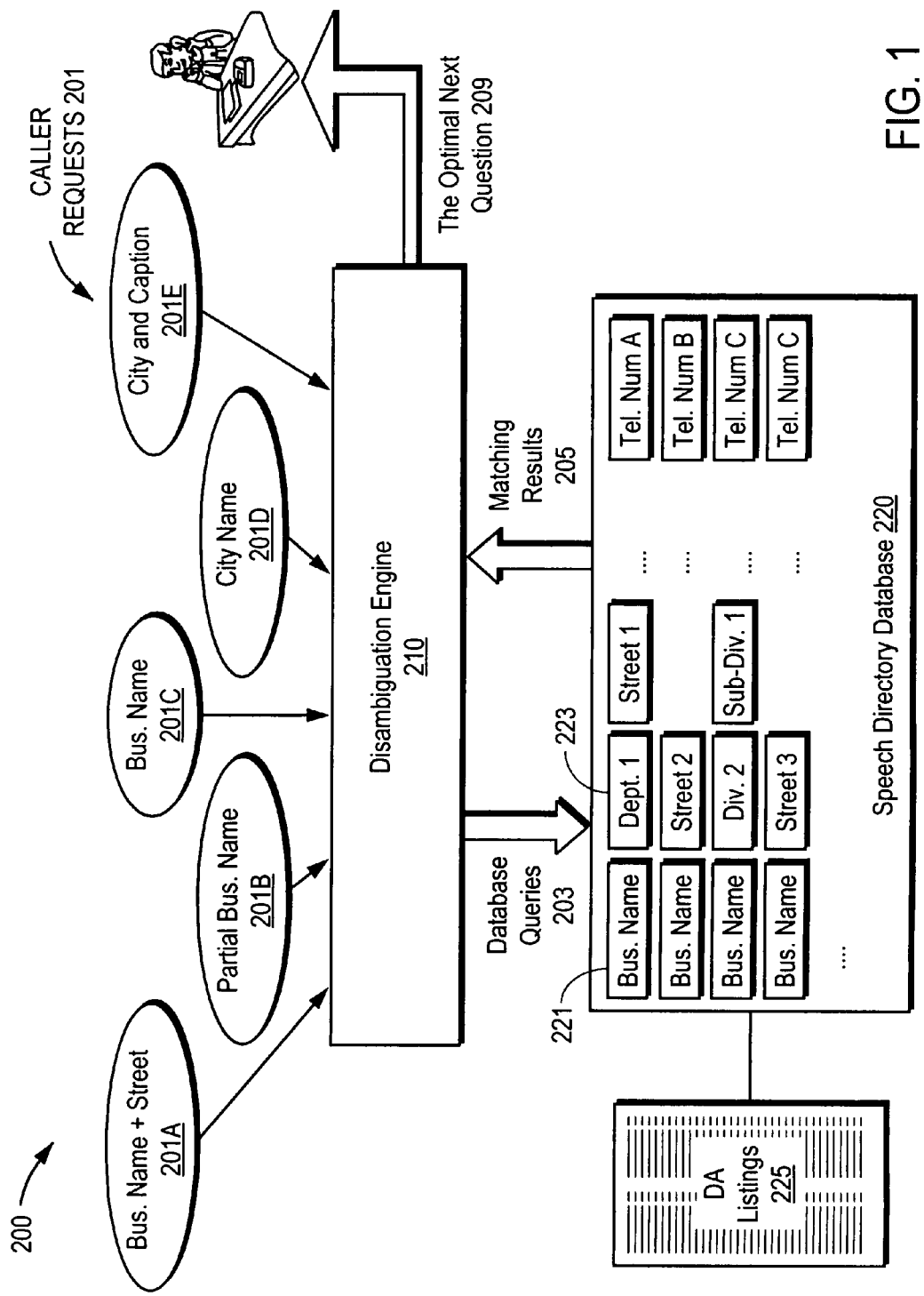
FIG. 1 illustrates a functional diagram of one embodiment of a directory assistance system.

A method and an apparatus to disambiguate requests for information in an interactive voice response (IVR) system are described. In the following description, numerous specific details are set forth. However, it is understood that embodiments of the invention may be practiced without these specific details. In other instances, well-known components, structures, and techniques have not been shown in detail in order not to obscure the understanding of this description.

In one embodiment, the method includes receiving a request for information from a user. Then data is retrieved from a back-end database in response to the request. However, ambiguity may arise in some cases. Ambiguity generally refers to situations in which multiple distinctive entries of data are found to match a single request. For example, ambiguity arises when multiple distinctive telephone numbers for different departments (e.g., women's clothing, men's clothing, customer service, home department, etc.) within a department store are found in response to a request for the telephone number of the department store. A configurable disambiguation system is used to dynamically resolve the ambiguity.

The disambiguation system has been configured with policies and/or rules to disambiguate requests. In general, a rule determines what the next step of disambiguation is based on distinctive ambiguous entries in the data retrieved. A policy generally defines ways to apply the rules to the data and behavior used for disambiguation. Based on the configuration of the disambiguation system and the data retrieved, the ambiguity within the request is dynamically resolved. To dynamically resolve the ambiguity, prompts and/or grammar are dynamically generated during the course of a disambiguation dialog with the user. Using the prompts, requests for clarification are made. In response to the disambiguation prompts, the user may clarify the request. Using the grammar generated, response from the user is analyzed to determine if the data retrieved may be further refined.

By using the above configurable disambiguation system to dynamically resolve ambiguity, a designer of the disambiguation system does not have to enumerate all possible disambiguation paths and states, which is a huge task susceptible to errors. Further, the way disambiguation is performed may be readily modified by editing the configuration files of the disambiguation system, thus making the disambiguation system a framework reusable for different applications.

Note that the disambiguation technique disclosed herein may be applied to flat or hierarchical data. Further, the disambiguation technique disclosed herein has many different applications, such as speech-driven automated directory assistance, speech-driven flight reservation system, hand-held-based automated directory assistance, speech-driven hotel reservation system, etc. In the following discussion, examples and features of the disambiguation technique are discussed in the context of speech-driven automated directory assistance (DA). However, one should appreciate that these examples are for illustration, and are not intended to limit the scope of the appending claims.

System Overview

FIG. 1 illustrates a functional diagram of one embodiment of a directory assistance (DA) system. The system 200 includes a disambiguation engine 210 and a speech directory database 220. A user of the system 200, also referred to as a caller, submits requests 201A-201E for telephone numbers of some entities of interest. However, the requests 201A-201E may provide different types of information to identify the entities of interest and the information in each request may or may not be sufficient to identify a single specific entity. For instance, the request 201A provides a business name and a street address to identify the entity of interest, the request 201B provides only a partial business name of the entity of interest, request 201C provides a complete business name of the entity of interest, request 201D provides a city name in which the entity of interest is in, and request 201E provides a city name as well as a value of a caption of the entity of interest. The requests 201A-201E are input to the disambiguation engine 210, which submits queries 203 to the speech directory database 220 to retrieve relevant data for the requests 201A-201E. For instance, the disambiguation engine 210 extracts the business name and the street address from the request 201A and fill slots of a query with the extracted business name and street address. Then the disambiguation engine 210 submits the query to the speech directory database 220 to retrieve entries having the business name and the street address.

In some embodiments, the speech directory database 220 is populated with data from a DA listing or a set of DA listings 225 from multiple sources (e.g., a published telephone directory from a telephone company). The data from the DA listings 225 is arranged in a format usable by the disambiguation engine 210. For example, data of each entry in the DA listings 225 is extracted and stored in the corresponding columns (such as business name, street address, department, telephone number, etc.) in the speech directory database 220. For example, the business name of the first entry in the speech directory database 220 is stored in slot 221 and the department of the first entry is stored in slot 222. In response to the queries 203, matching results 205 are returned from the speech directory database 220 to the disambiguation engine 210.

Based on the matching results 205 and configuration of the disambiguation engine 210, the disambiguation engine 210 determines if disambiguation is needed. If not, the disambiguation engine 210 returns the matching results 205 to the caller. Otherwise, if disambiguation is needed, the disambiguation engine 210 performs disambiguation. For example, the disambiguation engine 210 may generate a question based on the matching results 205 and configuration of the disambiguation engine 210. The configuration of the disambiguation engine 210 may include rules and/or policies. More details of the configuration of the disambiguation engine 210 are discussed below. The question generated is then rendered to the caller, who provides a response to the disambiguation engine 210. Based on the response, the disambiguation engine 210 may release a telephone number selected out of the matching results 205, generate further questions to continue the disambiguation process, or terminate the disambiguation process under certain conditions. More details of some embodiments of the disambiguation engine 210 and the disambiguation techniques are described below.

Disambiguation Engine Architecture

Figure 2:
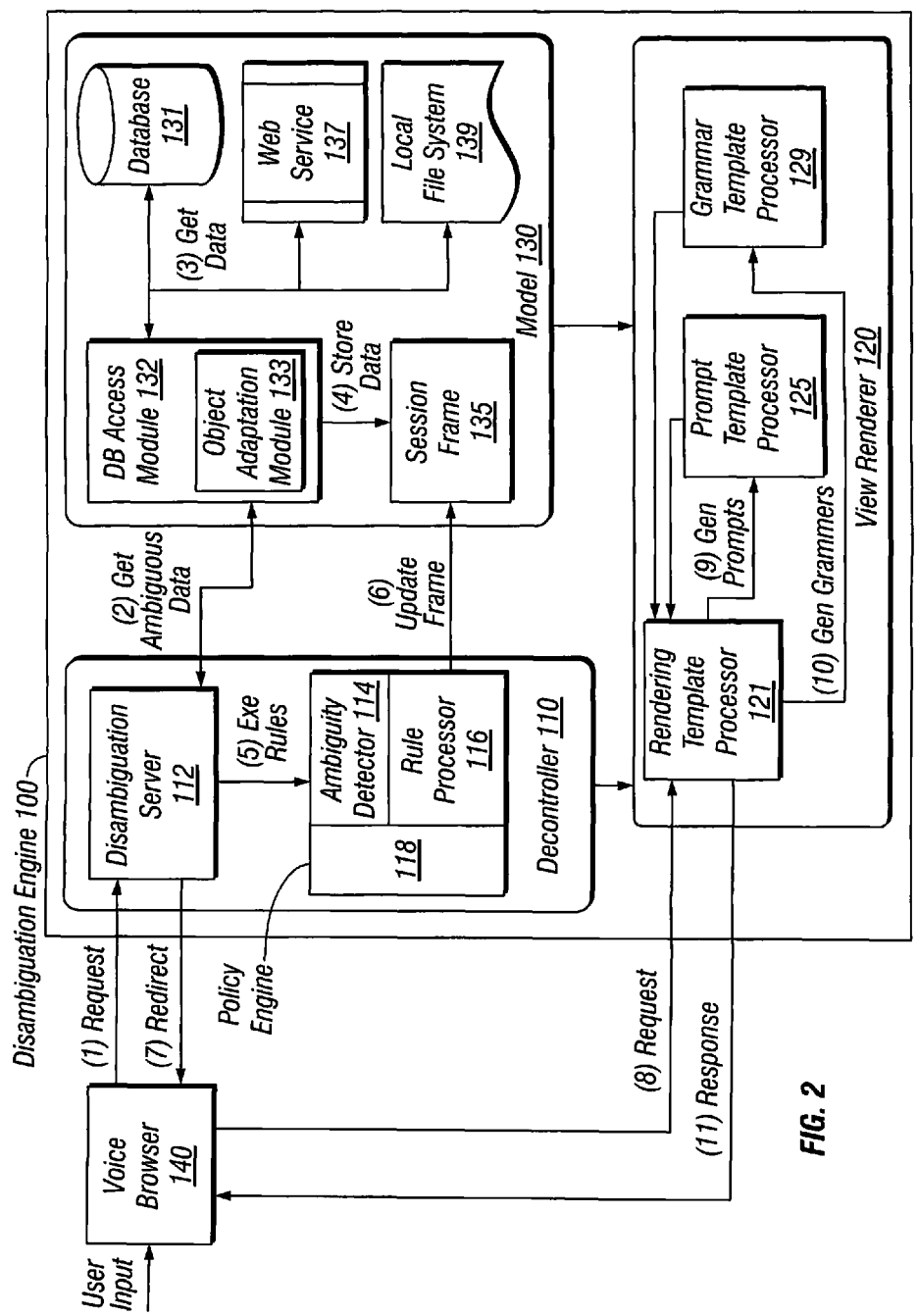
FIG. 2 illustrates an architecture of one embodiment of a disambiguation engine.

FIG. 2 illustrates the architecture of a disambiguation engine (DE) in a DA system according to one embodiment of the invention. The system 100 includes a DE controller 110, a view renderer 120, and a model 130, operatively coupled to each other. The DE controller 110 further includes a disambiguation server 112, an ambiguity detection module 114, a policy engine 118, and a rule processor 116. The view renderer 120 includes a rendering template processor 121, a prompt template processor 125, and a grammar template processor 129. The model 130 includes a database access module 132, an object adaptation module 133, and a session frame 135. The database access and object adaptation module 132 is operable to access a database 131, web service 137, and/or a local file system 139. In some embodiments, the local file system 139 includes documents written in Extensible Markup Language (XML). The disambiguation server 112 and the rendering template processor 121 are further coupled to a voice browser 140.

Note that any or all of the components of the DE 100 and associated hardware may be used in various embodiments of the present invention. However, it can be appreciated that other configurations of the DE 100 may include more or fewer devices than those discussed above.

As illustrated in FIG. 1, the DE 100 adopts a model-view-controller architecture, which may be used for various applications, such as web-based applications, voice applications, etc. In general, listing requests (e.g., Hypertext Transfer Protocol (HTTP) requests) from callers are passed from a client to the DE controller 110, which updates the model 130, and then invokes the view renderer 120, which renders a response to the request. The view renderer 120 uses a template-driven mechanism, and so may be extended to different types of views (e.g., voice, Hypertext Markup Language (HTML) documents, text, etc.). The model 130 includes the abstracted application-specific backend data. The DE controller 110 is independent of the application-specific back-end data, and therefore an interface is provided through which the data is adapted. This adapter model allows the DE 100 to be decoupled from the application specific data and its representation. Furthermore, the DE controller 110 includes the disambiguation server 112 that handles the client requests and the other business logic that is used to manipulate the model 130. The disambiguation server 112 may be implemented on the Java 2 Platform Enterprise Edition (J2EE) as a Servlet. To further illustrate the DE 100, an exemplary flow is described below.

Before receiving the first request for information, the disambiguation server 112 loads the rule processor 116 and the associated configuration files, as well as sets up the connection to the data access and object adaptation module 132. In response to user input, the voice browser 140 sends a request (e.g., a HTTP request) to the disambiguation server 112. Based on the user input, the voice browser 140 passes along a list of currently filled slots, as well as flags indicating which slots have already been confirmed, with the request. In some cases, the calling application may have placed data into a session (e.g., a J2EE session) in the session frame 135 that is to be used by the data access module 132 and object adaptation module 133. The disambiguation server 112 invokes data access through a generic interface. This generic interface is implemented by an application-specific data access class or module. The application specific data access class or module fetches a set of data that satisfies the request, such as by performing a query to the back-end database 131 with the currently filled slots as the query parameters. The data access module 132 accesses the data source (e.g., the back-end database 131, another database via the web service 137, the local file system 139, etc.), and fetches the data. The data is then manipulated by the DE 100 through a generic data adaptation interface, the object adaptation module 133. This generic interface is implemented for the specific application to translate the application specific data into a generic form that is understood by the DE 100.

Note that the data is potentially ambiguous because multiple entries matching the request may be retrieved. The disambiguation server 112 invokes the rules processor 116 to determine if the data requires disambiguation, and if it does, executes the pre-loaded rules on the data from the session frame 135. The rule processor 116 then updates the session frame 135 with the applicable rule. The controller 110 determines if a confirmation or disambiguation dialog is required and redirects the voice browser 140 to the appropriate rendering template. The voice browser 140 requests the rendering template it was redirected to. The rendering template processor 121 invokes the prompt template processor 125, which utilizes the appropriate plug-in depending on the type of markup language used by the voice browser 140 (e.g., VoiceXML). The rendering template processor 121 further invokes the grammar template processor 129, which utilizes the appropriate plug-in depending on the grammar format supported by the voice browser 140. The rendering template processor 121 returns the generated speech markup to the voice browser 140, and the confirmation or disambiguation dialog begins.

With the above introduction in mind, various components in the system 100 are described in greater detail below.

Disambiguation Engine Controller

As mentioned above, the DE controller 110 includes the disambiguation server 112 and the rule processor 116. Together, these components handle incoming requests from the voice browser 140, and invoke the necessary components required to determine the next dialog state for the voice browser 140 to execute.

The disambiguation server 112, which may be implemented as a J2EE servlet, handles requests from the voice browser 140 and orchestrates the use of other components in order to determine the next response to deliver to the voice browser 140. The disambiguation server 112 performs various operations in response to a request for information. For example, the disambiguation server 112 extracts data from the incoming request, including, for example, recognition slot names, value pairs, and confirmation flags for slots that may have already been disambiguated and confirmed outside of the DE 100. Then the disambiguation server 112 invokes the data access and object adaptation module 132 to fetch the appropriate data based upon the extracted slot values. Next, the disambiguation server 112 invokes the rule processor 116 to attempt to match a rule based upon the configured rules and the data retrieved by the data access and object adaptation module 132. The disambiguation server 112 determines if confirmation of the current disambiguation operation is required based upon confidences and current confirmation status, and invokes a confirmation dialog if necessary. The disambiguation server 112 further determines if additional input is required, or if disambiguation is complete, by invoking the ambiguity detector 114, and redirects the voice browser 140 to the appropriate rendering template in the view renderer 120.

In addition to the disambiguation server 112, the controller 110 further includes the rule processor 116. The rule processor 116 is operable to apply rules by loading a rule configuration and running a set of ambiguous data through each of the rules until a match is found or all the rules have fired. The rule processor 116 performs various operations to apply the rules. For instance, the rule processor 116 loads disambiguation rules from a configuration file, which may be written in XML. The rule processor 116 accepts ambiguous data set in slot name/value (KV) pair format. The rule processor 116 removes any data from the set that has been disambiguated during the last dialog turn. For slots named in the current rule being processed, the rule processor 116 determines the number of unique values for each slot. If multiple distinctive values exist and disambiguation is possible, then the rule processor 116 determines whether to use an open or closed prompting strategy based on the number of distinctive slot values. The rule processor 116 invokes the ambiguity detector 114 to determine if the remaining data is unambiguous, and if so, ceases disambiguating. Finally, the rule processor 116 returns the matched rule.

As discussed above, ambiguity can generally be described as the case when multiple distinctive entries for a given set of recognized slots are returned in a request. When only one entry is returned, disambiguation is deemed successful in some embodiments. However, more complex definitions of success in disambiguation may be adopted in other embodiments.

In some embodiments, the ambiguity detector 114 is implemented as a plug-in since the definition of ambiguity may change depending on various factors, such as the disambiguation domain, backend data structure, and content. For example, in the DA domain, it is sometimes acceptable to return a listing that has not been completely disambiguated if the DE 100 determines that further disambiguation is likely to be unsuccessful due to the number of listings and/or the complexity of the dialog. The ambiguity detector 114 provides a way for integrators to implement custom logic that can bypass default DE processing. Since a call is made to the ambiguity detector 114 at the end of each dialog turn, integrators may prematurely halt execution of the DE 100 by having the ambiguity detector 114 tell the DE 100 that ambiguity has been resolved. By returning "true," the ambiguity detector 114 indicates to the DE 100 that disambiguation is complete and thus, the DE 100 returns control to the calling application.

Disambiguation Model

As mentioned above, the model 130 includes the data access interface and object adaptation interface 132 modules to retrieve and manipulate application-specific backend data to disambiguate, as well as a session frame 135, which provides a session scope storage mechanism, to store intermediate results, and data used by the rendering template processor 121, the prompt template processor 125, and/or the grammar template processor 129.

The DE 100 exposes an interface called DataAccessInterface through which the back-end data is fetched. When the DE 100 is employed in a particular application, all methods defined by this interface are implemented for access of data that is specific to the application. Through this pre-determined interface, the DE 100 is able to access the application-specific data yet remains completely independent of how this data is accessed or where this data comes from, e.g. Oracle database, file system, web service, etc. Since every particular application that employs the DE 100 may have a unique representation of the back-end data, the DE 100 exposes an adaptation interface called GenericDataAdapterInterface. This interface defines a set of methods to access particular fields of or manipulate the application-specific representation of the data. For example, in order to access the field of the data that corresponds to the "caption" or "department" slot, the GenericDataAdapterInterface defines the method:

public Object
   getFieldForSlot(Object applicationdata, Slot slot)

The application-specific class that implements the methods defined by GenericDataAdapterInterface then provides the implementation that retrieves the field from the data that corresponds to the "caption" or "department" slot, as in this example. This pre-determined interface allows the DE 100 to remain decoupled from the application-specific data manipulation and representation.

Disambiguation View

The third component in the DE 100 is the view renderer 120. The view renderer 120 is responsible for generating the response in the format that is specific to the application, such as VoiceXML speech markup that embodies the generated prompts and the GrammarXML (GrXML) grammar that defines the acceptable user input. The format of the response that is rendered by the DE 100 is defined in a set of template files that are based on the language defined by the Apache Velocity template framework. By rendering the response through these templates, the DE controller 110 is entirely decoupled from the view renderer 120 and is independent of the format in which the response is generated (e.g. VoiceXML, HTML, text, etc.). In some embodiments, the default implementation provides the disambiguation dialog and confirmation dialog templates such that VoiceXML speech mark-up is generated, and a grammar template which generates GrXML grammar.

In one embodiment, the same single rendering template is used to generate for all the various disambiguation rules. However, the configuration allows specification of a different template for each rule if a particular rule is required to create a differing dialog. As such, multiple rendering templates may be used depending on the disambiguation rule and/or the data being disambiguated.

To render a question, the rendering template processor 121 performs various operations. For example, the rendering template processor 121 determines if the applicable rule is open or closed. If the applicable rule is a closed rule, then all the possible choices are enumerated and the caller is requested to select one of the possible choices. If the applicable rule is an open rule, then the caller is informed that multiple entries are found and an open ended question is generated to request the caller to clarify the request. The prompt template processor 125 generates appropriate open or closed prompts using the prompt generation configuration for the applicable rule. Likewise, the grammar template processor 129 generates appropriate open or closed grammar for applicable rule. The default rendering templates generate appropriate speech markup for the voice browser 140, and a set of slots that are the subject of disambiguation for the applicable rule. The rendering template processor 121 may store spoken utterances for voice store and forward (VSF). Since disambiguation utterances are required for VSF in the automated directory assistance application, the DE templates for the directory assistance application gather and store each disambiguation utterance spoken by the caller. For rules that may fire more than once (e.g., captions in DA), the DE 100 attempts to store the most salient utterance (such as the first or the last utterance) and to remove any results that do not match the request upon further disambiguation.

In some embodiments, the default implementation generates VoiceXML speech markupto create a dialog with the caller. The prompts that are used to provide the information to the caller are generated based on the prompt configuration for the particular disambiguation rule (prompt configuration described below). For example, depending on the prompt configuration for a rule specifying disambiguation of the location of a directory assistance listing (both city and street simultaneously), the following dialog may be generated based on the ambiguous listings that are retrieved from the database:

DE: "Ok, I found 3 locations for that request. One on Prince Street in Montreal, one on King street, and one other. Which one would you like?"

Caller: "The one in Montreal"

DE: "Ok, to confirm, that was Prince Street in Montreal, Quebec right?"

Caller: "Yes"

In the above example, the DE 100 not only confirms Prince Street, but also confirms the previously gathered, but as yet unconfirmed information, namely, the province of Quebec. In addition to the prompt template processor 125, the view renderer 120 also includes the grammar template processor 129. The grammar template processor automatically generates the different possible user inputs for the slots defined by the disambiguation from the set of ambiguous data for the slots. In addition, the grammar generation provides a configuration mechanism to define additional optional phrases that are then added to the generated grammar for a particular slot. For example, when disambiguating the caption or department of a set of directory assistance listings, the caller may say the word "department" in addition to the provided choices. The word "department" could thus be added to the configuration for the caption slot, thus accepting all user responses that may or may not include this word. The grammar configuration also includes a mechanism to force words or phrases commonly found in the data to become optional in the grammar, and thus not required to be said by the caller. For example, a lot of directory assistance listings may include the word "incorporated" in the data, and yet the caller will unlikely not say this word as part of his response to a disambiguation dialog. As such, the word "incorporated" can be configured to be optional.

Configuring the Disambiguation Engine

In some embodiments, the DE 100 relies upon two configuration files: 1) disambiguation-configuration.xml, which contains the disambiguation rules used by the rule processor 116, and 2) disambiguation-prompt-configuration.xml, which contains prompt generation specification for each of the disambiguation rules and is used by the prompt template processor 125 to dynamically generate prompts. The dialog generator dynamically generates the prompts at runtime based on the rule's prompt configuration and on the ambiguous data that is currently being disambiguated.

Disambiguation rules determine what the next step of dialog is based on distinctive ambiguous item(s) in the data retrieved. These rules are configurable and may result in different behavior depending on the rule order because the rules are fired in the order that the rules appear in the rule configuration file. The rules handle multiple slots, and/or combinations of ambiguous data. When a rule is found to match the ambiguous data, the DE controller invokes this rule and automatically generates a disambiguation dialog, which includes prompts and grammar. More details of prompt and grammar generation are discussed below.

An application upon which the DE 100 is applied may have different types of data, and each data type may have a specific set of disambiguation rules. As such, the rules configuration allows specification of a different set of rules for each of the data types of the application. For example, in the directory assistance application, disambiguation is performed on listings data (datatype="listing"), cities/localities (datatype="locality"), and listing names (datatype="listing-name"). Each of these different data types is represented by a different class or construct, and the application-specific data access and data adaptation modules must take into consideration the data type being disambiguated to fetch and adapt the back-end data accordingly. To configure disambiguation rules per data type, one or more <rule> elements are added under <disambiguation-rules> in disambiguation-configuration.xml according to some embodiments of the invention. An exemplary rule is shown below:

```
<disambiguation-rules datatype="listing"
        slotlist="name city state caption street">
   <rule name="city-state-closed"
      type="closed"
      threshold="4"
      template="disambiguation-template.vm"
      confirmation-template="disambiguation-confirmation-template.vm"
      confirmation-threshold="50">
    <slot namelist="city state"/>
    <properties>
      <property name="max-error" value="3"/>
    </properties>
   </rule>
```

The top-level disambiguation-rules XML element defines that all the rules embodied by this element are application to the "listing" datatype. The first example rule shown above, defines a rule named "city-state-closed" with attributes: type, threshold, template, confirmation-template, and confirmation-threshold. The name attribute is the name of the rule and is used to trace the order of execution of the rule, and can be any arbitrary value selected by the integrator. The attribute type is one of "open" or "closed" and defines whether this rule will result in an open-ended disambiguation dialog or a closed disambiguation dialog, respectively. The threshold attribute defines the maximum number of unique items there must be in order for a closed disambiguation dialog to occur. The template and confirmation-template attributes defined the disambiguation dialog template and the confirmation dialog template respectively. The confirmation-threshold attribute defines the confidence score threshold, over which confirmation may be skipped. If the recognition confidence score during a disambiguation dialog is less than this threshold, then a confirmation dialog is invoked.

In some embodiments, the only sub-element allowed within a <rule> is a <slot> tag of the following form:
<slot namelist="city state"/>
The slot tag defines the slots or fields of the data that must be ambiguous in order for this rule to apply. In the example above, more than one slot is specified by separating each of the slot's names by a space in the value of the namelist attribute. If some slot names and values are collected outside of the DE 100, but are necessary to the disambiguation dialog, then the name strings passed on the query string has to match exactly the contents of the configuration file in order to allow the DE 100 to access such slot names and values. Further, confirmation flags are in the form of <slot name> plus "Confirmed" in some embodiments, e.g., cityConfirmed.

Configuring disambiguation-prompt-configuration.xml is similar to configuring disambiguation-configuration.xml in that there is typically one prompt generation rule for every disambiguation rule. The prompt configuration is kept separate from the rule configuration in order to keep the human readable configuration files easy to understand and manipulate, and to promote separation of concerns and modularity. Keeping the two configuration files distinct allows the prompt configuration to be updated independently without the risk of affecting the rule processor 116.

If a disambiguation rule fires, then a matching prompt configuration rule is extracted for generation of the corresponding prompt in the disambiguation dialog. To configure prompt generation rules, one or more <prompt-configuration> elements are added under the <disambiguation-prompt-configuration> parent. An exemplary prompt generation rule is shown below:

```
<prompt-configuration rule-name="city-state-closed">
  <!-- Disambiguation prompting -->
  <disambiguation>
    <prompt condition="rule-initial"
        name="city-state-closed-init_a.wav"
        text="I found"/>
    <prompt condition="rule-follow-up"
        name="city-state-closed-follow-up_a.wav"
        text="Ok. Now, I found"/>
    <prompt condition="same-rule-follow-up"
        name="city-state-closed-same-follow-up_a.wav"
        text="This time I found"/>
    <itemcount/>
    <prompt name="city-state-closed-init_b.wav"
        text="locations:"/>
    <enumerate connector-prompt-name="one.wav"
           connector-prompt-text="one"
           last-connector-prompt-name="and.wav"
           last-connector-prompt-text="and">
      <slot namelist="city state"/>
    </enumerate>
    <prompt name="city-state-closed-init_c.wav"
        text="Which one did you want?"/>
    <!-- Previous result is part of the disambiguation -->
    <previous-result>
      <prompt name="prev-init.wav"
          text="And I have one that's just listed as "/>
      <enumerate>
       <slot namelist="name caption street city state "/>
      </enumerate>
    </previous-result>
  </disambiguation>
  <!-- Confirmation prompting -->
  <confirmation>
    <prompt name="disambig-conf-3-init_a.wav"
         text="To confirm. That was "/>
    <enumerate>
```

-continued

```
    <slot namelist="name caption street city state"/>
  </enumerate>
  <prompt name="disambig-conf-3-init_b.wav"
      text="Right?"/>
  </confirmation>
</prompt-configuration>
```

The rule-name attribute of the prompt-configuration element must match a disambiguation rule defined in the rules configuration file. Each disambiguation rule must have a corresponding prompt configuration in the prompt configuration file.

The prompt configuration allows for distinct prompting for the disambiguation dialog (embodied within the <disambiguation> element) and for the confirmation dialog (embodied within the <confirmation> element). Within the <disambiguation> or <confirmation> elements, the following elements are allowed for different purposes: the <prompt> element is used to define a prompt audio file and the back-off text (that may be rendered with a text-to-speech engine), the <enumerate> element which defines the enumeration of the particular fields of the data, or the <itemcount> element which defines the playback of the number of unique ambiguous items being disambiguated during this particular disambiguation dialog. For example, the <prompt> element is statically defined, and contains the audio file prompt name, and the textual representation of the prompt. For example, an exemplary <prompt> element is shown below:
<prompt name="city-state-closed-init_a.wav" text="I found">

A <slot> element inside an <enumerate> element defines dynamic content to be rendered via text-to-speech (TTS) when the prompt is rendered. The <itemcount> element is often used in conjunction with the <enumerate> element to list the ambiguous choices to caller, in order to render a prompt of the form "I found 3 Starbucks locations for that request. Which one do you want?"

In some embodiments, a <previous-result> element is provided, which corresponds to a feature of the DE 100 that allows a selected item to be collapsed during the previous dialog turn into the next interaction. Thus, the caller is provided with the option of halting further disambiguation. For example, if the caller finds that none of the current disambiguation choices are as good as the one the caller selected during the last dialog turn, then the caller may select the previous result, and exit disambiguation. The <previous-result> element provides the prompt that should prefix the collapsed previous selection.

A sample dialog generated by a <previous-result> element is shown below, in which the previous result is the listing information for New York Times:
Caller: "New York Times"
System: "I found 3 sublistings. One for circulation, one for classifieds, and one for fax lines, or you can still get the listing information for New York Times. Which one do you want?"
Caller: "Just give me the number for the New York Times"
System: "Okay, the number is . . . "

More examples of disambiguation rules are shown in the table illustrated in FIG. 3. Each of the rules in FIG. 3 has an open/closed threshold. If the number of entries retrieved in response to a request is above the open/closed threshold, an open disambiguation prompt associated with the rule is rendered. Otherwise, a closed disambiguation prompt associated with the rule is rendered. In addition, some of the rules may be associated with a confirmation prompt to confirm an entry selected from the entries retrieved is the one the user wants.

Since the DE 100 is configurable, a designer of the DA system does not have to enumerate all possible disambiguation paths and states, which is a huge task susceptible to errors. Further, the way disambiguation is performed may be readily modified by editing one or more the configuration files of the DE 100, thus making the DE 100 a framework reusable for different applications.

Degree of Disambiguation

In some embodiments of a DA system, "success" is defined as releasing a number for a listing. After listening to lots of calls in existing DA deployments and in calling human operators for directory assistance requests, it became clear that neither these applications nor human operators are very conscientious about providing the right number. They are often too quick to release "a" number as opposed to really trying to release the right number. At the other extreme, a disambiguation engine may try too long even if it is unclear whether going deeper into the data is necessarily better than releasing a number that exists at some point.

To work well, a good balance between the somewhat contradictory goals of achieving high success rates and providing a high degree of usability has to be achieved. Either one alone would not produce acceptable result. In other words, the DE 100 needs to have a way of determining the optimal time to give up and hand control back to the voice browser 140 for the overall DA system. In some embodiments, this determination is based on two factors—the length of the disambiguation dialog that has been completed so far and an estimate of the degree of difficulty of the disambiguation problem ahead.

In some embodiments, the DE 100 uses two measures to determine when to stop trying for hierarchical databases. The first measure is a configurable threshold, which specifies how deep in the hierarchy the DE 100 should go before the DE 100 should give up. This threshold is called disambiguation-level-threshold. Another measure is the estimation of the degree of difficulty of the remaining dialog, which is based on an estimate of the degree of difficulty of the grammars for the choices being provided. When both thresholds are exceeded, the DE 100 stops disambiguating and releases a number to the caller. An integrator of the DA system may set and adjust these thresholds based on experience and/or statistics collected from the DA system.

Dialog Generation

In addition to observing the thresholds discussed above, the DE 100 may follow various overriding rules. In one embodiment, an overriding rule provides that, at any point in the disambiguation, if there is only one node with an associated phone number left and this node has only one child, then the number at that node is released. Further disambiguation may not be performed.

In some embodiments, the data is organized hierarchically such that there are multiple levels of data and there are one or more nodes on each level. For example, the data may be organized into a tree graph. Note that in a DA system, a node may or may not have an associated telephone number. The DE 100 reviews the data one level at a time during disambiguation. If the DE 100 has resolved down to only one node that does not have an associated telephone number on a particular level, but this node has one child with a number on another level, then the DE 100 may release the number of the child node without asking further questions.

In some embodiments, some listings may have very long and complex names that may be difficult to recognize properly. So, the DE 100 estimates the degree of difficulty of the future dialog by calculating an AdjustedWordLength of the grammar choices at any point. The AdjustedWordLength of a grammar choice refers to the number of words that have to be input for that choice to match. One overriding rule provides that, if the engine ends up with only one node with an associated phone number and more than one of its children have AdjustedWordLengths greater than a predetermined threshold, then the number at that node is released.

During disambiguation, the parent of the current node(s) may be offered in addition to the other choices. In some embodiments, if the DE 100 ends up with a single listing and decides to continue with further disambiguation (as determined based on other rules) and if the parent has an associated phone number, then the parent is also offered along with the other choices.

Prompt Generation

In some embodiments, some special prompt rules are added to make the prompts more natural and less monotonous. The prompt for every rule is generated by using one of several configurable prompt segments, such as transitional phrases (e.g., "Okay"), to be used in different situations, such as: A) when this is the first rule to match, B) when this is the second (or greater) time the same rule matches in succession, and C) when this rule matches after some other rule has matched before it. Using this prompt strategy, the dialog sounds more natural as shown by the following exemplary disambiguation dialog:

System: "I found it on three streets: Main street, Floyd road, and Willow bend. Which one is it?" [Case A]
User: uh, yes it's on Floyd road.
System: "Ok, now I found 2 departments or sublistings: card member inquiries and line of credit inquiries. Which would you like?" [Case B]
User: card member inquiries
System: "This time, I found 3 more: apply for a card, lost or stolen card, or billing information. Which would you like?" [Case C]

Without the above approach, the dialog would have been much more monotonous. The above approach is consistent with generally accepted dialog principles that the system has to keep track of the current state of the dialog and has to insert appropriate discourse markers to make the dialog flow more naturally.

Grammar Generation

In general, speech from the caller may be recognized by comparing the caller's utterances to a set of "grammars." In this context, a grammar is defined as a set of one or more words and/or phrases ("expressions") that a caller is expected or required to utter in response to a corresponding prompt, and the logical relationships between such expressions. The logical relationships include the expected or required temporal relationships between expressions, whether particular expressions are mandatory, optional, alternatives, etc. Defining and generating the grammars may be time-consuming and difficult, thus, the grammar template processor 129 in the DE 100 uses grammar templates to generate grammar.

The DE 100 uses the grammar template processor 129 to automatically generate grammars used to recognize the caller's utterance during the disambiguation dialog. The grammar generated returns at least one slot in order to avoid ambiguity within the grammar. To ensure the grammar generated returns at least one slot, the grammar template processor 129 checks to make sure that each slot that can be returned has at least one parse or possible phrase associated with the slot. Further, the grammar template processor 129 may also check to make sure that each phrase usable to parse the grammar returns at least one slot.

In some embodiments, a set of predetermined words in the choices being offered are made optional depending on the type of slot that this choice belongs to. For example, for company names, words like "limited", "incorporated", "company", etc., are made optional since the caller may not always provide the complete name. Likewise, for street names, words like "street", "avenue", "highway", etc. are made optional.

Policy

Policies define ways to apply business rules to the data and behavior used for disambiguation. There are multiple different types of disambiguation policies, such as release policies, data access policies, data filter policies, and rule selection policies. Default policies are used when no other policies are defined or if a defined policy fails. The different types of policies are exposed as interfaces by the DE 100 and policies specific to the application must implement the corresponding interface and abide by the contract defined by the DE interface. Some exemplary policies are discussed in details below to illustrate the concept.

Release policies are criteria that if met, allow the DE 100 to immediately select a piece of unambiguous data to be "released" without executing the disambiguation rules and behavior. For example, a "Release Main" release policy might enable the following business rule: If only one main number has been specified for the search space (local book, fallback book, or generalized search across all books), then release that number without disambiguating.

Data access policies allow the DE 100 to bypass the default data access methods based on some predetermined criteria. For example, a default data access policy for DA may include some rules that define when to stop the disambiguation process. In some embodiments, a "Frequently Requested Listing (FRL)" data access policy might enable the following business rule: For a listing recognized in a "What Listing" context, in which the first question posed to the caller is "What is the listing name?", only those sublistings flagged as "FRL" are candidates for disambiguation.

Data filter policies are applied following the data access policies. In general, data filter policies include predetermined criteria that allow the DE 100 to filter the data to be included for disambiguation based on the criteria. For example, a "Book ID" data filter policy might enable the following business rule: Given that 80% of enquiries are within a caller's local book, the listings query for FRLs may be restricted to only those within the caller's local book. If no match is found within the local book, then a secondary book that has been specified for that local book is searched. If there is still no match, then an open query is sent to all books.

Rule selection policies allow a user to customize how rules are selected based on certain criteria. In some embodiments, the DE 100 goes through all possible rules that could match the disambiguation data at hand and provides a list to the rule selection policy to make the final rule selection. If no rule selection policy is defined or if it fails, the default rule selection policy of choosing the first matching rule is used. For example, a "Caption Empty" Rule Selection policy attempts to prevent a caption question being asked when multiple rows exist in which the caption slot is empty. Where the caption field contains data that it shouldn't, such as locality data, this policy will act to make sure that a caption question is not asked inappropriately.

In some embodiments, the policy engine 118 applies the policies during disambiguation. In order to include these policies or additional rules, an interface for each type of policy is implemented. The policy is then activated via a policy configuration file. In this policy configuration file, policies are first defined by being given a name within the scope of the configuration file and mapped to the programmed class the implements the interface. An example of a policy definition is shown below:

```
<policy-definition name="pre-disambiguation-main-number-release"
    type="release"
    java-class=
"com.nuance.ndaa.disambiguation.policy.MainNumberReleasePolicy"/>
```

The type attribute for this policy definition specifies that this is a release type policy, and therefore the interface pertaining to release policies (i.e., ReleasePolicy) has to be implemented by the Java class that is defined by the java-class attribute. In this case, the fully qualified class name is "com.nuance.ndaa.disambiguation.policy.MainNumberReleasePolicy." Once the policy is defined, the policy can be activated in the policy configuration file as part of a group of policies. An example of this is shown below:

```
<policy-group name="pre-disambiguation-policies">
    <policy name="pre-disambiguation-main-number-release"/>
</policy-group>
```

All policies within a policy-group are applied in order for the entire policy group to apply. When multiple policy groups are defined in the policy configuration, only the first policy group encountered that takes effect in its entirety will be executed, i.e., all the policies within the group activate successfully. In other words, either all policies are applied successfully or none is applied according to some embodiments of the invention.

Examples of Disambiguation

Figure 4A:
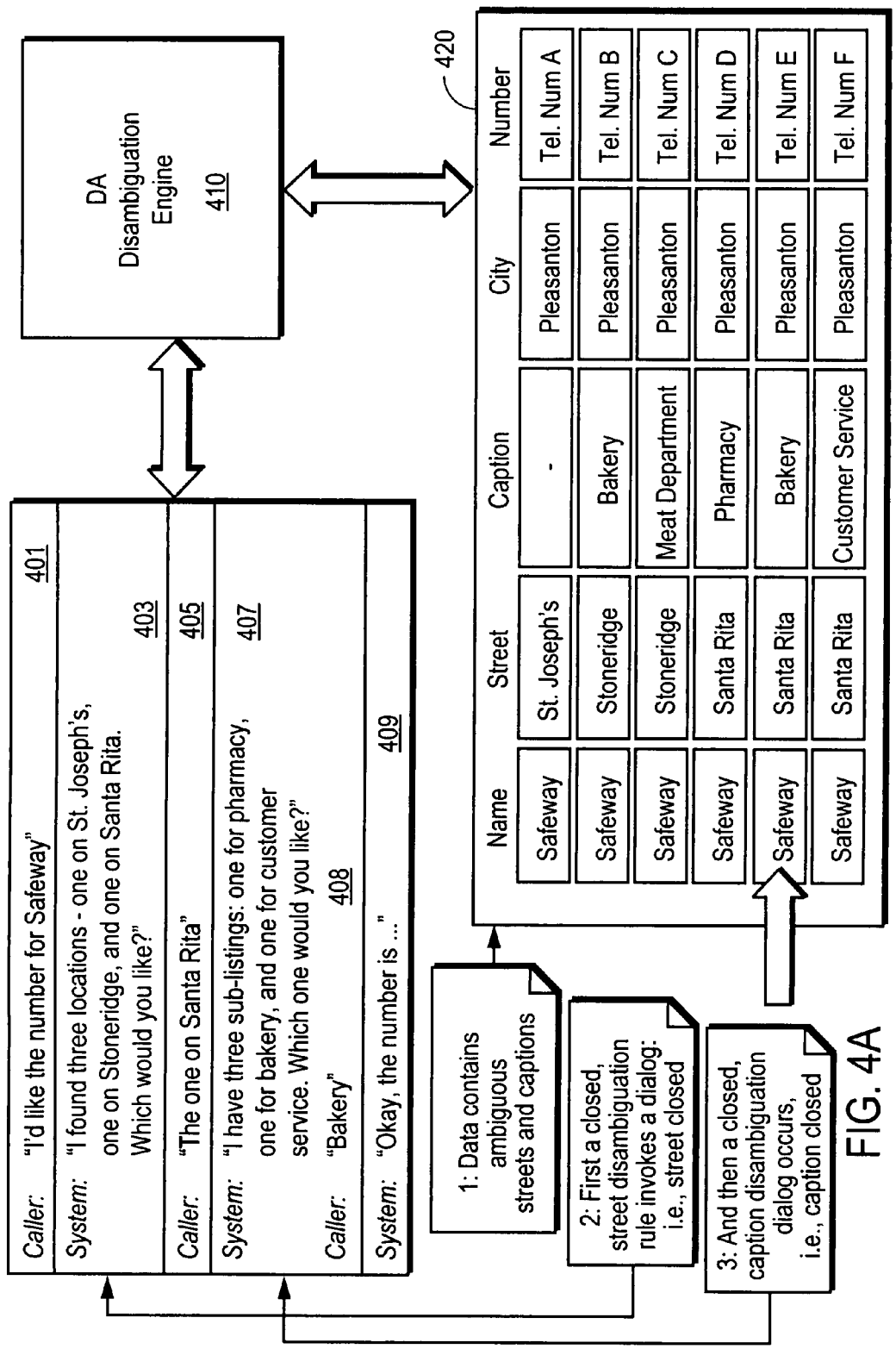
FIGS. 4A-4C illustrate some examples of disambiguation according to some embodiments of the invention.
Figure 4B:
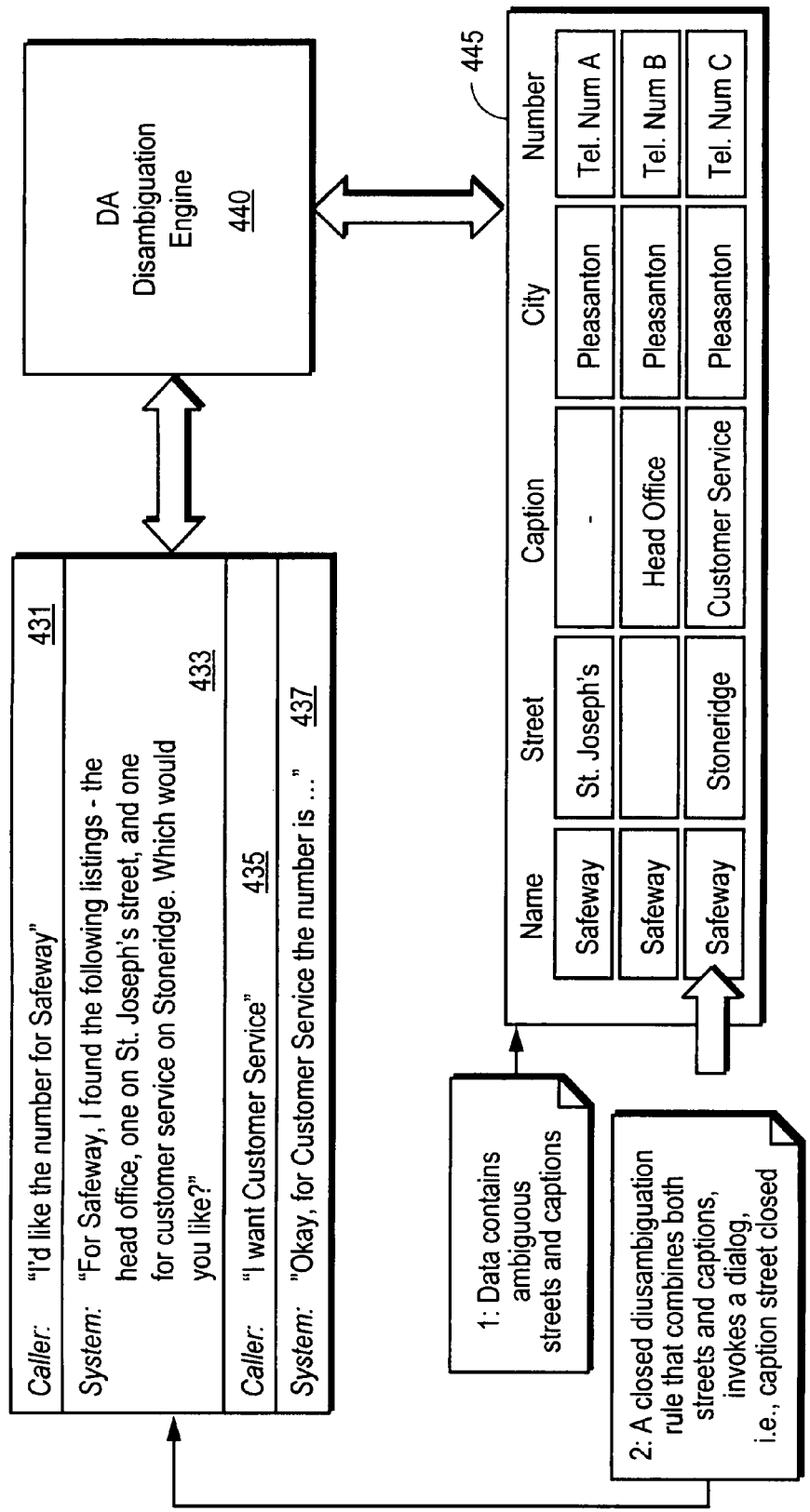
Figure 4C:
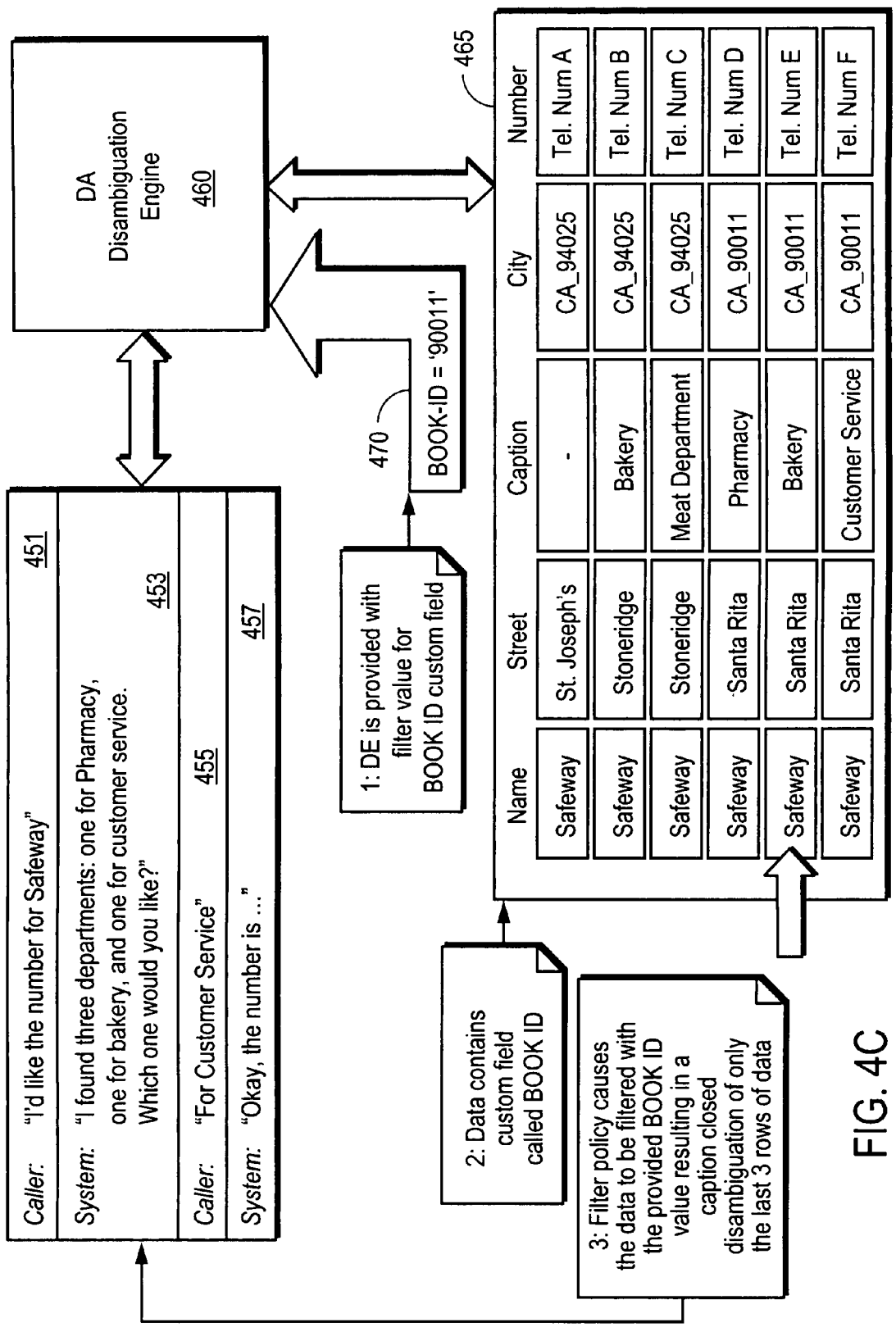

FIGS. 4A-4C illustrate some examples of disambiguation according to some embodiments of the invention. These examples are in the context of directory assistance. However, as explained above, the disambiguation technique disclosed herein is not limited to directory assistance applications.

Referring to FIG. 4A, a caller submits a request 401 for the number for Safeway. In response to the request 401, the DA disambiguation engine 410 searches for the number for Safeway in the listing database 420. As shown in FIG. 4A, the listing database 420 contains multiple entries for Safeway at different streets with different captions. The DA disambiguation engine 410 applies a closed street disambiguation rule to invoke a dialog by asking question 403, namely, "I found three locations—one on St. Joseph's, one on Stoneridge, and one on Santa Rita. Which would you like?" Then the caller submitted a response 405, namely, "The one on Santa Rita." Since there are multiple entries for the Safeway on Santa Rita, the ambiguity has not been resolved yet. The DA disambiguation engine 410 applies a closed caption disambiguation rule to further clarify the request. Specifically, the DA disambiguation engine 410 asks another question 407, "I have three sub-listings: one for pharmacy, one for bakery, and one for customer service. Which one would you like?" In response, the caller submits another response 408, namely, "Bakery." Based on the response 408, the DA disambiguation engine 410 narrows down the entries retrieved to only one and returns the one entry by rendering the statement 409: "Okay, the number is . . . "

FIG. 4B illustrates another example of disambiguation according to one embodiment of the invention. A caller submits a request 431 for the number for Safeway. In response to the request 431, the DA disambiguation engine 440 searches for the number for Safeway in the listing database 445. As shown in FIG. 4B, the listing database 445 contains multiple entries for Safeway at different streets with different captions. The DA disambiguation engine 440 applies a closed disambiguation rule that combines both streets and captions to invoke a dialog by asking question 433, namely, "For Safeway, I found the following listings—the head office, one on St. Josephs Street, and one for customer service on Stoneridge. Which would you like?" Then the caller submits a response 435, namely, "I want Customer Service." Based on the response 435, the DA disambiguation engine 440 narrows down the entries retrieved to only one and returns the one entry by rendering the statement 437: "Okay for Customer Service, the number is . . . "

FIG. 4C illustrates another example of disambiguation according to one embodiment of the invention. A caller submits a request 451 for the number for Safeway. In response to the request 451, the DA disambiguation engine 460 searches for the number for Safeway in the listing database 465. As shown in FIG. 4B, the listing database 445 contains multiple entries for Safeway at different streets with different captions. Based on a predetermined policy, the DA disambiguation engine 460 applies a filter value 470 for BOOK-ID custom field to narrow down the entries to those with a BOOK-ID entry equal to CA_90011. Then the DA disambiguation engine 460 generates a prompt 453 according to a caption-closed disambiguation rule. The prompt 453 is "I found three departments: one for pharmacy, one for bakery, and one for customer service. Which would you like?" The caller then submits a response 455, which is "For customer service." Thus, the DA disambiguation engine 460 releases the corresponding number to the caller at 457.

Process to Disambiguate Requests

Figure 5:
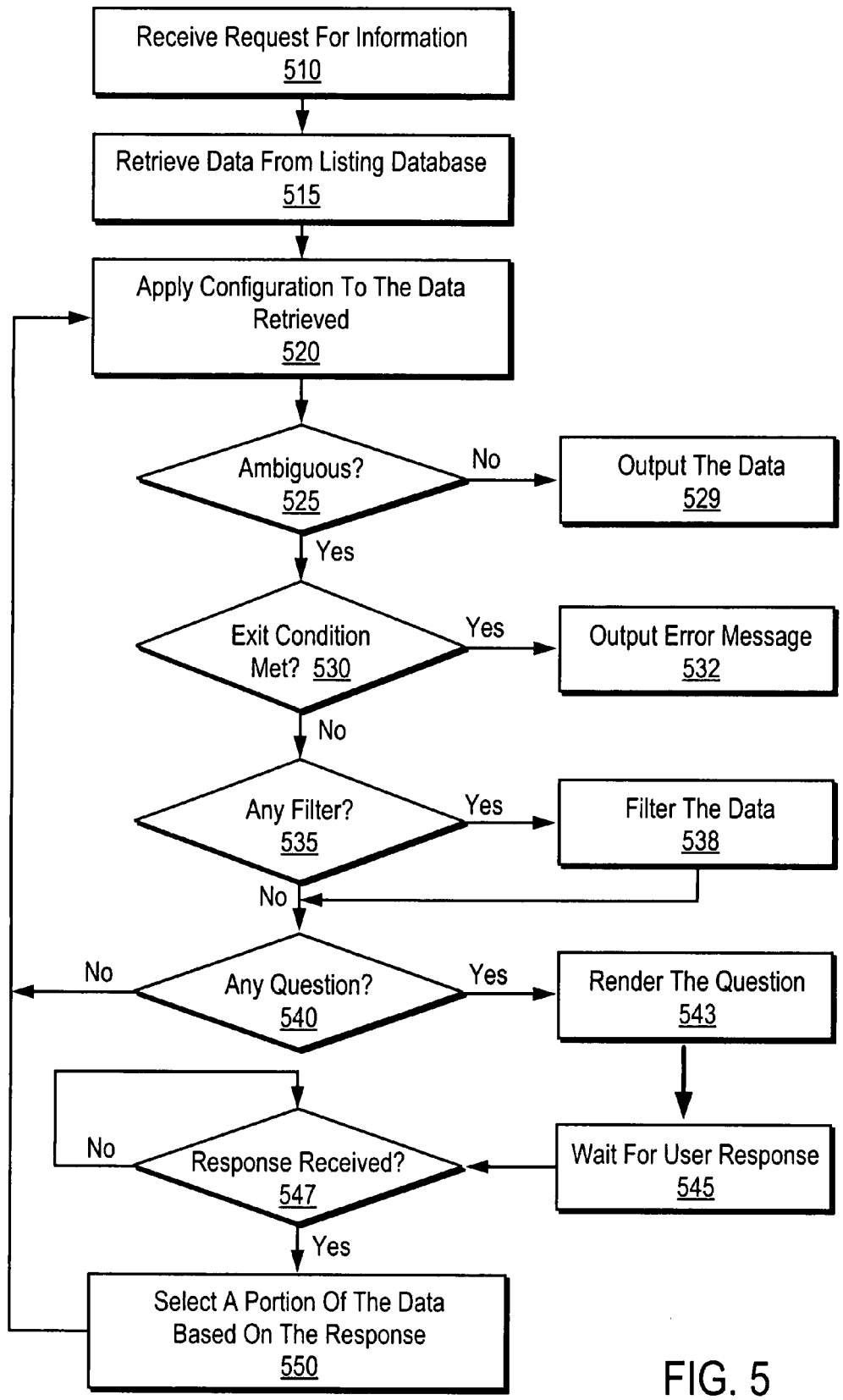
FIG. 5 illustrates a flow diagram of one embodiment of a process to disambiguate a request for information.

FIG. 5 illustrates a flow diagram of one embodiment of a process to disambiguate a request for information. The process is performed by processing logic of a disambiguation engine that comprises hardware (e.g., circuitry, dedicated logic, etc.), software (such as is run on a general-purpose computer system or a dedicated machine), firmware, or a combination of any of the above.

Referring to FIG. 5, processing logic receives a request for information from a user (processing block 510). In response to the request, processing logic retrieves data from a listing database (processing block 515). Then processing logic applies a configuration of the disambiguation engine to the data retrieved (processing block 520). The configuration may include a set of rules and/or policies.

At processing block 525, processing logic determines if the request is ambiguous based on the data retrieved. As discussed above, the request is considered ambiguous if the data retrieved includes multiple different entries (e.g., multiple telephone numbers for different departments within a store are retrieved in response to a request for a telephone number for the store). If not, then processing logic outputs the data retrieved (processing block 529). Otherwise, processing logic checks if any exit condition has been met (processing block 530). For instance, an exit condition may be defined by one policy to be the number of prompts rendered has exceeded a predefined threshold value. If an exit condition has been met, then processing logic may output an error message (processing block 532). Alternatively, processing logic may take other appropriate actions according to the policies in the configuration of the disambiguation engine, such as directing the user to a human operator. If no exit condition has been met, processing logic transitions to processing block 535.

At processing block 535, processing logic checks if any filter has been provided by the policies in the configuration of the disambiguation engine. If there is a filter, then processing logic applies the filter to the data retrieved to refine the data (processing block 538) and then transitions to block 540. Otherwise, processing logic transitions to block 540.

At processing block 540, processing logic checks if any question is to be rendered according to the rules in the configuration of the disambiguation engine. If there is no question to be rendered according to the rules, then processing logic transitions back to processing block 520 to repeat the operations on the current set of data.

If there is a question, then processing logic renders the question (processing block 543). Next, processing logic waits for a response from the user (processing block 545). Processing logic checks if a response is received at processing block 547 and remains in processing block 547 until a response is received. When a response is received, processing logic selects a portion of the data based on the response (processing block 550). Then processing logic returns to block 520 to repeat the operations on the remaining data. Details of some examples of the disambiguation process and some embodiments of the disambiguation engine have been discussed above.

Figure 6:
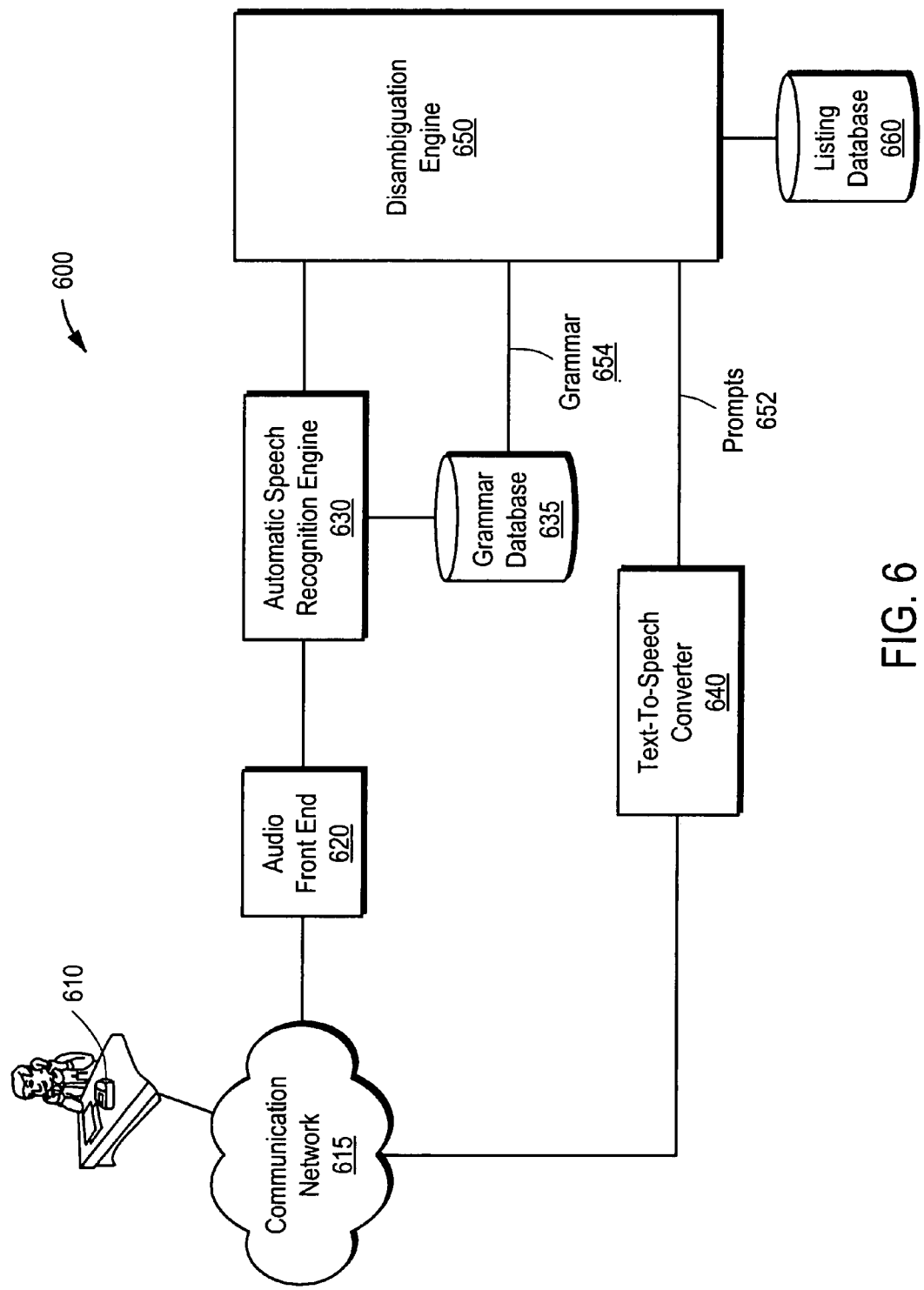
FIG. 6 illustrates one embodiment of a directory assistance system.

FIG. 6 illustrates one embodiment of a directory assistance system. The system 600 includes an audio front end 620, an automatic speech recognition engine 630, a grammar database 635, a text-to-speech converter 640, a disambiguation engine 650, and a listing database 660. A user of the system 600 makes a call to the system 600 using a telephone 610, which is communicatively coupled to the audio front end 620 via a communication network 610. The communication network 610 may include a PSTN, a VoIP network, etc. The audio front end 620 routes speech of the user to the automatic speech recognition engine 630, which analyzes the speech of the user and recognize the request submitted by the user in the speech. The speech recognition engine 630 then sends the request to the disambiguation engine 650.

Based on the request, the disambiguation engine 650 then submits a query to the listing database 660 to retrieve data from the database 660 that satisfy the request. Based on the data retrieved and configuration of the disambiguation engine 650, the disambiguation engine 650 determines if disambiguation has to be performed. If so, the disambiguation engine 650 performs disambiguation. The disambiguation engine 650 applies rules and policies in the configuration to the data retrieved and dynamically generates prompts and grammar to request clarification from the user. The prompts 652 generated are sent to the text-to-speech converter 640, which converts the prompts 652 to audio data. The audio data is sent to the telephone 610 via the communication network 615 to be played out to the user. The grammar 654 generated is sent to the grammar database 635 so that the automatic speech recognition engine 630 is able to retrieve the grammar 654 from the grammar database 635. The automatic speech recognition engine 630 uses the grammar 654 to recognize a response to the prompt 652 from the user. Details of some embodiments of the disambiguation engine 650 and the process to disambiguate requests have been discussed above.

Figure 7:
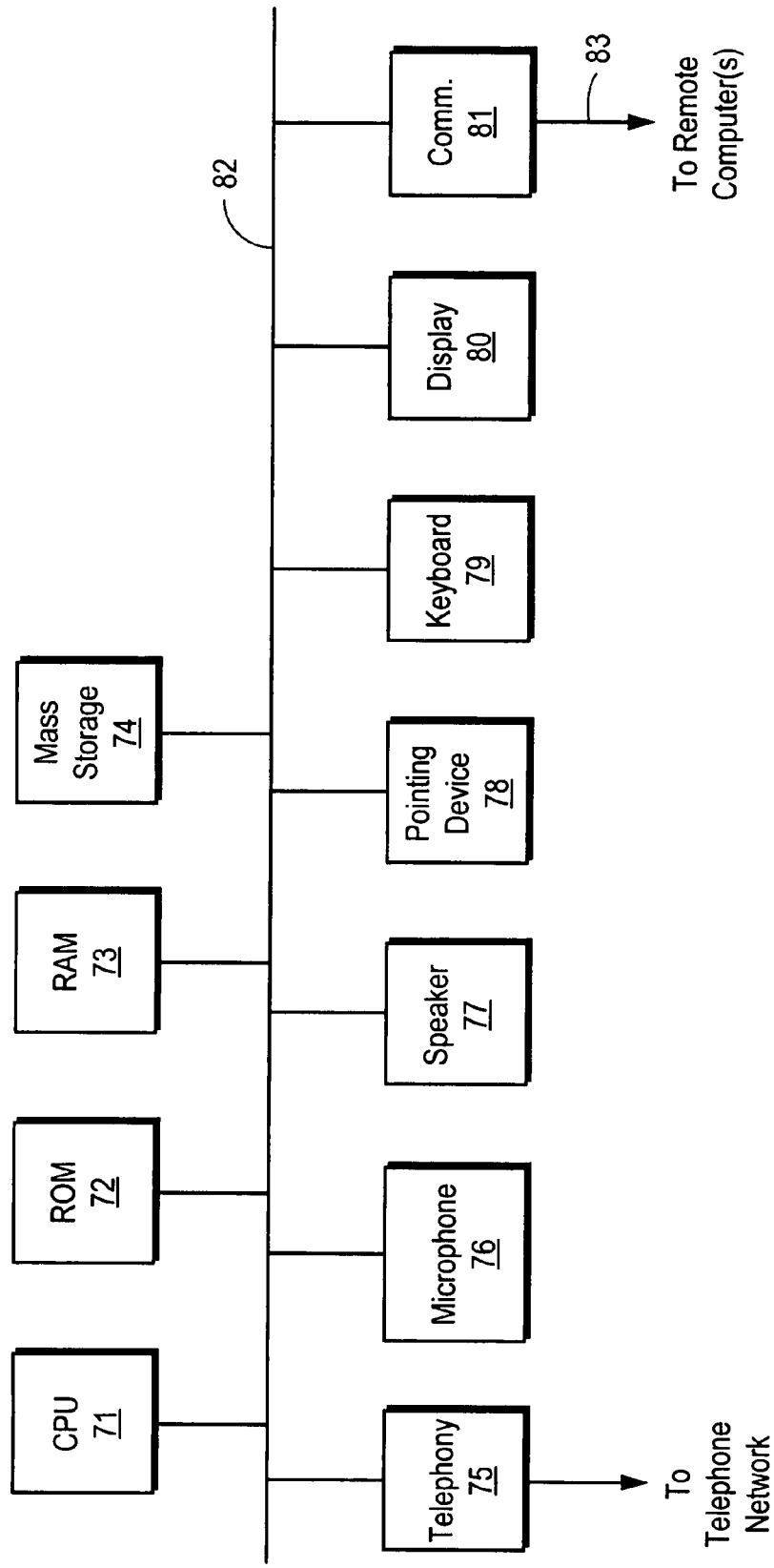
FIG. 7 illustrates an exemplary computing system usable to implement one embodiment of a disambiguation system.

FIG. 7 illustrates an example of a computer system in which the aforementioned components and techniques can be implemented. It will be recognized that many variations upon the illustrated system can be used to implement these components and techniques. The illustrated computer system includes a central processing unit (CPU) 71 (e.g., a microprocessor), read-only memory (ROM) 72, random access memory (RAM) 73, and a mass storage device 74, each coupled to a bus system 82. The bus system 82 may include one or more physical buses coupled to each other through one or more bridges, controllers and/or adapters. For example, the bus system 82 may include a "system bus" coupled to one or more peripheral buses, such as a peripheral component interconnect (PCI) bus or the like. Also coupled to the bus system are a telephony interface 75, and audio subsystem that includes a microphone 76 and a speaker 77, a pointing device 78, a keyboard 79, a display device 80, and a data communication device 81.

The mass storage device 74 may include any suitable device for storing large volumes of data, such as a magnetic disk or tape, magneto-optical (MO) storage device, flash memory, or any of various types of Digital Versatile Disk (DVD) or compact disk (CD) storage. The telephony interface 75 provides the computer system with a telephone connection to a remote caller via a telephone network, which may include a public switched telephone network (PSTN), a voice over Internet Protocol (VoIP) network, etc. The telephony interface 75 may also include equipment for digitizing and ends pointing speech received over the telephone connection, to condition the input speech for processing by the speech recognizer. The microphone 76 and speaker 77 may be components of a telephone I/O device (i.e., handset or headset), such as illustrated in FIG. 1 and FIG. 3, to allow a user of the computer system (e.g., the directory assistance operator) to speak with the remote caller. The pointing device 78 may be any suitable device for enabling a user to position a cursor or pointer on the display device 17, such as a mouse, trackball, touchpad, touch-sensitive display screen, or the like. The display device 80 may be any device suitable for displaying alphanumeric, graphical and/or video data to a user, such as a cathode ray tube (CRT), a liquid crystal display (LCD), or the like. The data communication device 81 may be any device suitable for enabling the computer system to communicate data with a remote processing system over communication link 83, such as a conventional telephone modem, a cable modem, an Integrated Services Digital Network (ISDN) adapter, a Digital Subscriber Line (xDSL) adapter, an Ethernet adapter, or the like.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a machine-accessible medium, also referred to as a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer-implemented method comprising:
   receiving a request for information from a user;
   retrieving data from a database within a system in response to the request; and
   dynamically resolving ambiguity within the request based, in part, on a predetermined configuration of the system and the data retrieved, said resolving ambiguity further comprising applying one or more policies from a set of a plurality of predetermined policies comprising: release policies, data access policies, data filter policies, rule selection policies, and default policies.

2. The method of claim 1, wherein the configuration comprises a rule and resolving ambiguity within the request comprises:
   generating a prompt based on the data retrieved and the rule at runtime; and
   rendering the prompt to the user.

3. The method of claim 2, further comprising:
   generating the prompt using a first predefined template.

4. The method of claim 2, wherein resolving ambiguity within the request further comprises:
   receiving a response to the prompt from the user;
   generating a grammar using a second predefined template;
   recognizing the response using the grammar;
   selecting a portion of the data retrieved based on the response; and
   generating a second prompt based on at least one of the portion of the data retrieved, the response, and a second rule within the configuration if the ambiguity remains.

5. The method of claim 2, wherein the prompt is an open-ended question if the data retrieved includes a number of entries exceeding a predefined threshold.

6. The method of claim 2, wherein the prompt is a close-ended question if the data retrieved includes a number of entries below a predefined threshold.

7. The method of claim 1, wherein and applying a data filter policy of the plurality of predetermined policies to the retrieved data comprises filtering the retrieved data using a criterion specified in the data filter policy.

8. The method of claim 1, further comprising:
   rendering an error message if the ambiguity is not resolved under a predefined condition according to the configuration of the system.

9. An apparatus comprising:
   a user interface to allow an integrator of a directory assistance system to define a configuration of the directory assistance system; and
   a disambiguation engine operatively coupled to the user interface to dynamically resolve ambiguity within a user request for information according to the configuration of the directory assistance system said disambiguation engine further configured for applying one or more policies from a set of a plurality of predetermined policies comprising: release policies, data access policies, data filter policies, rule selection policies, and default policies.

10. The apparatus of claim 9, further comprising:
    a configuration database operatively coupled to the disambiguation engine to store the configuration.

11. The apparatus of claim 9, further comprising:
    a database operatively coupled to the disambiguation engine to store the information.

12. The apparatus of claim 9, wherein the configuration includes a rule and the disambiguation engine is operable to generate a prompt based on the data retrieved and the rule.

13. The apparatus of claim 12, wherein the disambiguation engine comprises:
    a prompt template processor to generate the prompt using a first predefined template.

14. The apparatus of claim 13, further comprising:
    a voice browser to aurally present the prompt to a user.

15. The apparatus of claim 14, further comprising:
    a second user interface to receive a response from the user; and
    a grammar template processor to generate a grammar using a second predefined template used by the disambiguation engine to recognize the response.

16. The apparatus of claim 9, wherein the user interface comprises a first user interface control to allow the integrator to select a policy out of said plurality of predefined policies.

17. The apparatus of claim 9, wherein the user interface comprises a second user interface control to allow the integrator to modify the configuration.

18. A system comprising:
    a database; and
    a directory assistance system operatively coupled to the database, the directory assistance system comprising:
    an input module to receive a request for information from a user;
    a database access module to retrieve data from the database in response to the request; and
    a configurable disambiguation engine to dynamically resolve ambiguity within the request based, in part, on a predetermined configuration of the directory assistance system and the data retrieved, said configurable disambiguation engine further configured for resolving ambiguity by applying one or more policies from a set of a plurality of predetermined policies comprising: release policies, data access policies, data filter policies, rule selection policies, and default policies.

19. The directory assistance system of claim 18, wherein the configuration comprises a rule and the disambiguation engine is operable to generate a first prompt based on the data retrieved and the rule.

20. The directory assistance system of claim 19, wherein the disambiguation engine is operable to select a portion of the data retrieved based on a response to the first prompt from the user.

21. The directory assistance system of claim 19, wherein the disambiguation engine is operable to generate a second prompt based on at least one of the response to the first prompt, the portion of the data retrieved, and a second rule within the configuration if the ambiguity remains.

22. The directory assistance system of claim 19, further comprising:
a voice browser to aurally present the first prompt to the user.

23. A machine-accessible medium that stores instructions which, if executed by a processor, will cause the processor to perform operations comprising:
creating a first user interface to allow an integrator of a directory assistance system to define a configuration of the directory assistance system, wherein ambiguity within a request for information submitted to the directory assistance system is dynamically resolved based, in part, on the configuration and data retrieved in response to the request
wherein said configuration is further configured for applying one or more policies from a set of a plurality of predetermined policies comprising: release policies, data access policies, data filter policies, rule selection policies, and default policies, and
storing the configuration in a configuration database.

24. The machine-accessible medium of claim 23, wherein the operations further comprise:
creating a second user interface to allow the integrator to modify the configuration.

25. The machine-accessible medium of claim 23, wherein the first user interface comprises:
creating a user interface control to allow the integrator to select a policy out of said plurality of predefined policies.

* * * * *